(12) United States Patent
Lee et al.

(10) Patent No.: US 10,277,884 B2
(45) Date of Patent: Apr. 30, 2019

(54) METHOD AND APPARATUS FOR ACQUIRING THREE-DIMENSIONAL IMAGE, AND COMPUTER READABLE RECORDING MEDIUM

(71) Applicant: MEDIT CORP., Seoul (KR)

(72) Inventors: Soo Bok Lee, Seoul (KR); Sung Bin Im, Seoul (KR)

(73) Assignee: MEDIT CORP., Seoul (KR)

( * ) Notice: Subject to any disclaimer, the term of this patent is extended or adjusted under 35 U.S.C. 154(b) by 0 days.

(21) Appl. No.: 15/312,506

(22) PCT Filed: Mar. 20, 2015

(86) PCT No.: PCT/KR2015/002772
§ 371 (c)(1),
(2) Date: Nov. 18, 2016

(87) PCT Pub. No.: WO2015/178577
PCT Pub. Date: Nov. 26, 2015

(65) Prior Publication Data
US 2017/0094254 A1      Mar. 30, 2017

(30) Foreign Application Priority Data
May 20, 2014    (KR) .......................... 10-2014-0060568

(51) Int. Cl.
*G01B 11/25*        (2006.01)
*G03B 35/08*        (2006.01)
(Continued)

(52) U.S. Cl.
CPC ....... *H04N 13/239* (2018.05); *G01B 11/2527* (2013.01); *G01B 11/2545* (2013.01);
(Continued)

(58) Field of Classification Search
CPC ...................... H04N 13/0239; H04N 13/0007
(Continued)

(56) References Cited

U.S. PATENT DOCUMENTS

2010/0315490 A1    12/2010   Kim et al.

FOREIGN PATENT DOCUMENTS

KR    10-2001-0009721 A    2/2001
KR    10-2002-0021700 A    3/2002
(Continued)

OTHER PUBLICATIONS

International Search Report for PCT/KR2015/002772 dated Jun. 9, 2015 from Korean Intellectual Property Office.
(Continued)

*Primary Examiner* — On S Mung
(74) *Attorney, Agent, or Firm* — Paratus Law Group, PLLC (57) ABSTRACT

Disclosed herein is a method for acquiring a three-dimensional (3D) image including: acquiring a 3D primary image of an object from two-dimensional (2D) primary image data acquired by first and second cameras when a predetermined pattern is projected on the object by a projector and a 2D primary image of the pattern-projected object is acquired by the first and second cameras, and then converting it into a 2D re-viewpoint image; correcting a missing area in the 2D re-viewpoint image corresponding to the 3D data missing area for compensating for a 3D data missing area caused by a curvature of the object and the points of view of the first and second cameras; and generating a corrected 3D image by referring to the 2D primary image data acquired by the first or second camera and the corrected 2D re-viewpoint image information.

6 Claims, 5 Drawing Sheets

(51) Int. Cl.
*H04N 13/00* (2018.01)
*H04N 13/106* (2018.01)
*H04N 13/111* (2018.01)
*H04N 13/239* (2018.01)
*H04N 13/254* (2018.01)

(52) U.S. Cl.
CPC ......... *H04N 13/106* (2018.05); *H04N 13/111* (2018.05); *H04N 13/254* (2018.05); *G03B 35/08* (2013.01); *H04N 2013/0088* (2013.01)

(58) Field of Classification Search
USPC .......................................................... 348/47
See application file for complete search history.

(56) References Cited

FOREIGN PATENT DOCUMENTS

| | | |
|---|---|---|
| KR | 10-0332995 B1 | 4/2002 |
| KR | 10-1259835 B1 | 5/2013 |

OTHER PUBLICATIONS

Erik Lilienblum et al., "Optical 3D Surface Reconstruction by a Multi-Period Phase Shift Method", Journal of Computers, vol. 2, No. 2, Apr. 2007, pp. 73-83.

Haeng-jae Lee, et al., "A Study of Three Dimension Image Height Information Analysis by PSI(Phase-Shift Interferometry)", Collection of Articles of Academic Conferences Summer by Korean Institute of Electrical Engineering, Jul. 14 to 17, 2009, pp. 1767-1768.

METHOD AND APPARATUS FOR ACQUIRING THREE-DIMENSIONAL IMAGE, AND COMPUTER READABLE RECORDING MEDIUM

CROSS REFERENCE TO PRIOR APPLICATIONS

This application is a National Stage Patent Application of PCT International Patent Application No. PCT/KR2015/002772 (filed on Mar. 20, 2015) under 35 U.S.C. § 371, which claims priority to Korean Patent Application No. 10-2014-0060568 (filed on May 20, 2014), which are all hereby incorporated by reference in their entirety.

TECHNICAL FIELD

The present invention relates to a method and an apparatus for acquiring a three-dimensional (3D) image, and a computer readable recording medium. More specifically, the present invention relates to a method and apparatus for acquiring a three-dimensional (3D) image, and a computer readable recording medium, in which the method for acquiring a 3D image for acquiring 3D shape information of an object by a projector and first and second cameras acquires a 3D primary image of the object and then converts the acquired 3D primary image into a 2D re-viewpoint image based on a viewpoint at which the projector views the object and in order to compensate for a 3D data missing area caused by a curvature of the object and the points of view of the first and second camera, corrects a missing area in the 2D re-viewpoint image corresponding to the 3D data missing area within the 3D primary image by referring to information on a pattern projected on the object by the projector and then generates the corrected 3D image by referring to (i) the 2D primary image data acquired by the first camera or the second camera and (ii) the corrected 2D re-viewpoint image information, thereby removing the error that a portion of the acquired 3D image is missed.

BACKGROUND ART

In recent years, applications of a three-dimensional (3D) shape measurement technology have been expanded to a field having a closer relationship with our lives such as ceramics industry, shoe industry, jewelry industry, and dental technology as well as engineering such as mechanical engineering and automotive engineering.

As an example of the related art for measuring the shape of the 3D object, a pattern projection method for projecting pattern light of a plurality of patterns on a subject and imaging the subject on which images of the pattern light are projected to perform a shape measurement using a principle of triangular measurement based on a deformation of the patterns has been known. Among these methods, a spatial encoding method for performing binary encoding on a space by projecting light of a stripe pattern in which bright parts and dark parts are alternately disposed at any width has been known in a field of a 3D measurement. Reviewing the 3D shape measurement process according to the spatial encoding method with reference to Korean Patent Laid-Open Publication No. 2001-0009721, first, a series of patterns is sequentially projected on an object to be measured and the patterns are repeatedly photographed by each camera to obtain (camera calibration) a relative position (external variable) and focal distances of cameras and a lens distortion coefficient (internal variable) based on a reference coordinate system and find out correspondence on which line of an image photographed by a second camera a specific line of an image photographed by a first camera corresponds to, prior to photographing an object to be measured by a CCD camera set Next, a computer controller uses pattern image information to obtain a 3D point data. For this purpose, one line having the same history among lines corresponding to the final pattern projected on each of the photographed images is taken as a sample and 3D coordinates of points forming the line are obtained.

Meanwhile, in addition to the spatial encoding method, as another method for measuring a shape of a 3D object by projecting a light pattern, a phase shift method has also been known. The phase shift method images lattice patterns on an object to be measured and then acquires phase values at each point of an image of the lattice patterns imaged on the object to be measured. Meanwhile, the detailed method for acquiring a phase from an image of lattice patterns is disclosed in 'study on 3D image height information analysis using phase-shift interferometry (PSI)' presented in collection of articles of academic conferences summer Jul. 14 to 17, 2009 by Korean Institute of Electrical Engineering.

The foregoing related arts correspond to the method for obtaining relatively higher measurement precision. However, in acquiring 3D information from 2D image information acquired by two cameras, the related arts may not acquire 3D point data for a specific point of an object to be measured when only one camera photographs the specific point of the object to be measured but the other camera does not photograph the specific point, due to a shape of the object to be measured or a position of the camera.

DISCLOSURE

Technical Problem

The present invention has been proposed to solve all of the above-mentioned problems.

An object of the present invention is to convert a 3D primary image acquired by first and second cameras into a 2D re-viewpoint image of a re-viewpoint and correct the 2D re-viewpoint image and then more accurately correct missed data by referring to information on the corrected 2D re-viewpoint image in calculating 3D data.

Technical Solution

In one general aspect, a method for acquiring 3D shape information of an object by a projector and first and second cameras includes: (a) acquiring, by an image correction apparatus, a 3D primary image of the object from two-dimensional (2D) primary image data acquired by the first and second cameras when a predetermined pattern is projected on the object by the projector and a 2D primary image of the pattern-projected object is acquired by the first and second cameras and then converting the acquired 3D primary image into a 2D re-viewpoint image based on a viewpoint at which the projector views the object; (b) correcting, by the image correction apparatus, a missing area in the 2D re-viewpoint image corresponding to the 3D data missing area in the 3D primary image by referring to information on the pattern that the projector projects on the object in order to compensate for a 3D data missing area caused by a curvature of the object and the points of view of the first and second cameras, the 3D data missing area is an area in which 3D data are not present within the 3D primary image; and (c) generating, by the image correction apparatus, the corrected 3D image by referring to (i) 2D primary image data acquired by the first camera or the second camera and (ii) the corrected 2D re-viewpoint image information.

In another general aspect, an image correction apparatus for acquiring 3D shape information of an object by a projector and first and second cameras includes: a re-viewpoint image generator acquiring, by an image correction apparatus, a 3D primary image of the object from two-dimensional (2D) primary image data acquired by the first and second cameras when a predetermined pattern is projected on the object by the projector and a 2D primary image of the pattern-projected object is acquired by the first and second cameras and then converting the acquired 3D primary image into a 2D re-viewpoint image based on a viewpoint at which the projector views the object; a 2D missing area corrector correcting a missing area in the 2D re-viewpoint image corresponding to the 3D data missing area in the 3D primary image by referring to information on the pattern that the projector projects on the object in order to compensate for a 3D data missing area caused by a curvature of the object and the points of view of the first and second cameras, the 3D data missing area is an area in which 3D data are not present within the 3D primary image; and a 3D correction image generator generating the corrected 3D image by referring to (i) 2D primary image data acquired by the first camera or the second camera and (ii) the corrected 2D re-viewpoint image information.

Advantageous Effects

According to the exemplary embodiments of the present invention, it is possible to convert the 3D primary image acquired by the first and second cameras into the 2D re-viewpoint image of the re-viewpoint and correct the 2D re-viewpoint image and then more accurately correct the missed area of the 3D image occurring when the specific point of the object is photographed only by one of the two cameras and is not photographed by the other camera by referring to the information on the corrected 2D re-viewpoint image in calculating the 3D data.

BEST MODE

Exemplary embodiments of the present invention will be described in detail with reference to the accompanying drawings. These embodiments will be described in detail for those skilled in the art in order to practice the present invention. It should be appreciated that various exemplary embodiments of the present invention are different from each other, but do not have to be exclusive. For example, specific shapes, structures, and characteristics described in the present specification may be implemented in another exemplary embodiment without departing from the spirit and the scope of the present invention in connection with an exemplary embodiment. In addition, it should be understood that a position or an arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings.

Hereinafter, in order for a person having ordinary skill in the art to which the present pertains to easily practice the present invention, the exemplary embodiments of the present invention will be described in detail with reference to the accompanying drawings.

Figure 1:
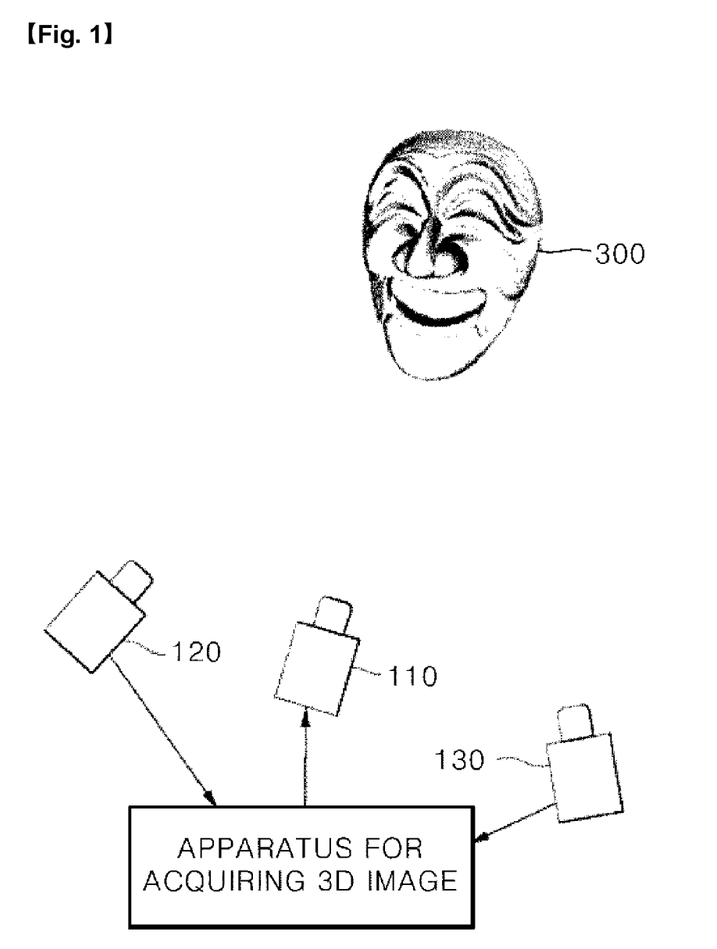
FIG. 1 is a diagram illustrating a schematic configuration of an overall system for acquiring 3D shape information of an object according to an exemplary embodiment of the present invention.

FIG. 1 is a diagram illustrating a schematic configuration of an overall system for acquiring 3D shape information of an object according to an exemplary embodiment of the present invention.

As illustrated in FIG. 1, the overall system according to the exemplary embodiment of the present invention may be configured to include a first camera 120, a projector 110, a second camera 130, a 3D image acquisition apparatus 200, and an object 300 for acquiring a 3D image.

First, the projector 110 according to the exemplary embodiment of the present invention may serve to project a predetermined pattern on the object 300 and may be controlled by the 3D image acquisition apparatus 200 to be described below.

To obtain a phase image of the object 300, the projector 110 according to the exemplary embodiment of the present invention may be configured to project a lattice pattern having a predetermined wavelength on the object, in more detail, sequentially project four lattice patterns of which the phases move by $\pi/2$. Further, to obtain a gray code image of the object 300, a stripe pattern in which bright parts and dark parts are alternately disposed at any width may be projected on the object and stripe pattern light of n patterns may be irradiated while sizes of regions of the bright part and the dark part are sequentially reduced.

Next, the first camera 120 and the second camera 130 according to the exemplary embodiment of the present invention are to serve to acquire reflected pattern light of the pattern-projected object. Here, a CCD camera, a CMOS camera, an image camera, a web camera, a digital camera, or the like may be adopted as the first camera 120 and the second camera 130 according to the exemplary embodiment of the present invention and may be controlled by the apparatus 200 for acquiring a 3D image to be described below. The first camera 120 and the second camera 130 are disposed to be spaced apart from each other and the first camera 120 may acquire a 2D image of one side surface of the object 300 and the second camera 130 may acquire a 2D image of other side surfaces of the one side of the object 300, whenever a predetermined pattern is projected from the projector 110. For example, when the projector 110 sequentially projects four lattice patterns of which the phases move by π/2, the first camera 120 and the second camera 130 may each acquire the 2D images by four sheets.

Finally, the apparatus 200 for acquiring a 3D image according to the exemplary embodiment of the present invention may serve to control the projector 110 to sequentially project each pattern and controlling the first camera 120 and the second camera 130, respectively, to acquire the images of the object 300 on which the patterns are sequentially projected. Further, the apparatus 200 for acquiring a 3D image may acquire the 3D image of the object from the 2D image acquired by the first camera 120 and the second camera 130.

The configuration and function of the apparatus 200 for acquiring a 3D image according to the exemplary embodiment of the present invention will be described in detail based on the following detailed description.

Figure 2:
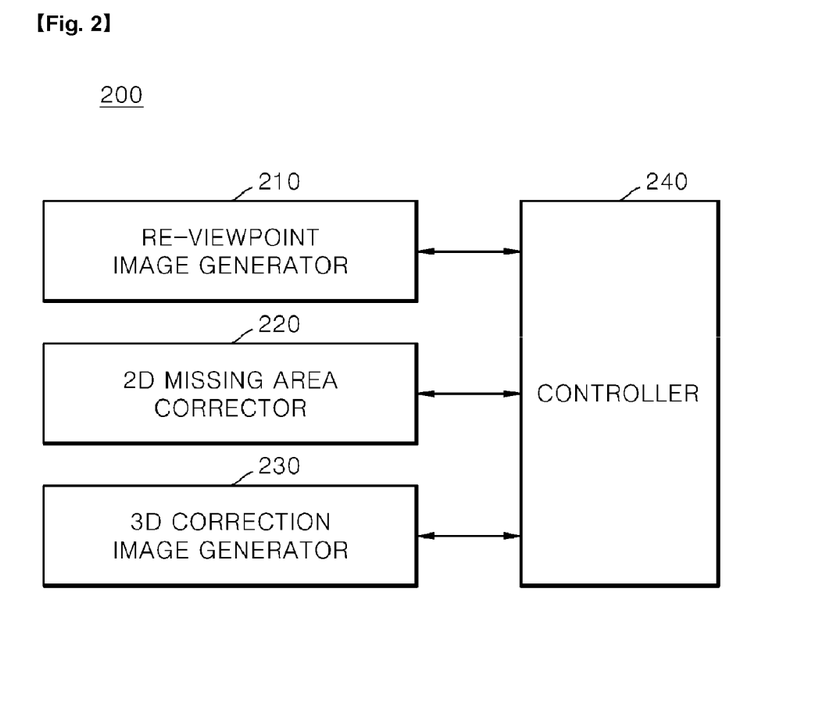
FIG. 2 is a diagram illustrating in detail an internal configuration of an apparatus for acquiring a 3D image according to an exemplary embodiment of the present invention.

FIG. 2 is a diagram illustrating in detail an internal configuration of the apparatus 200 for acquiring a 3D image according to an exemplary embodiment of the present invention.

As illustrated in FIG. 2, the apparatus 200 for acquiring a 3D image according to the exemplary embodiment of the present invention may be configured to include a re-viewpoint image generator 210, a 2D missing area corrector 220, a 3D correction image generator 230, and a controller 240. According to the exemplary embodiment of the present invention, at least some of the re-viewpoint image generator 210, the 2D missing area corrector 220, the 3D correction image generator 230, and the controller 240 may be a program module communicating with the projector 110, the first camera 120, or the second camera 130. These program modules may be included in the apparatus 200 for acquiring a 3D image in a form of an operating system, an application program module and other program modules, and be physically stored in several known storage devices. Further, these program modules may also be stored in a remote storage device capable of communicating with the program module. Meanwhile, these program modules include, but are not limited to, a routine, a sub-routine, a program, an object, a component, a data structure, or the like, that executes a specific task or executing a specific abstract data type to be described below according to the exemplary embodiment of the present invention.

First, if the projector 110 projects predetermined patterns on the object and 2D primary images of the corresponding pattern-projected object 300 by the first camera 120 and the second camera 130 are acquired, the re-viewpoint image generator 210 according to the exemplary embodiment of the present invention may serve to acquire a 3D primary image of the object 300 from the 2D primary image data acquired by the first camera 120 and the second camera 130 and then convert the acquired 3D primary image into the 2D re-viewpoint image based on the viewpoint where the projector 110 views the object 300. The term "primary image" in the present specification may mean an image before correction to differentiate the 3D image before correction and a 3D image after correction, in acquiring the 3D image of the object 300.

Figure 3A:
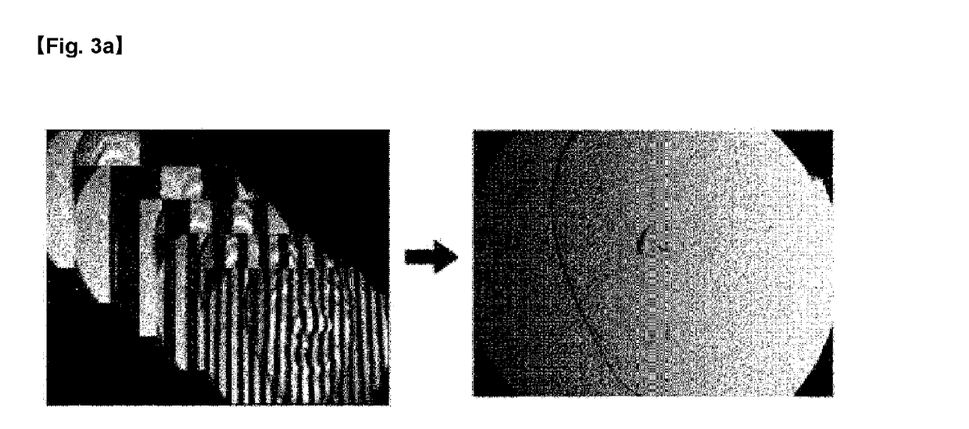
FIGS. 3A to 3C are diagrams for exemplarily describing acquisition of a 3D primary image of an object from a 2D primary image data acquired by a first camera and a second camera according to an exemplary embodiment of the present invention.
Figure 3B:
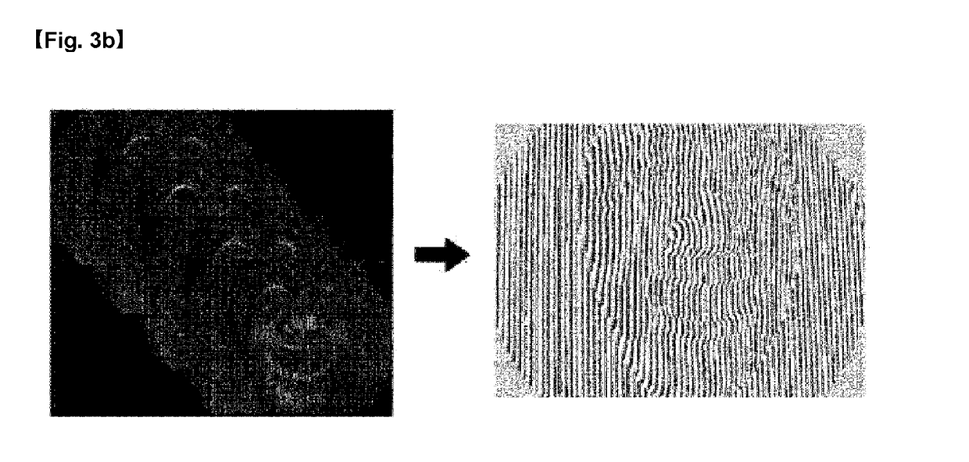
Figure 3C:
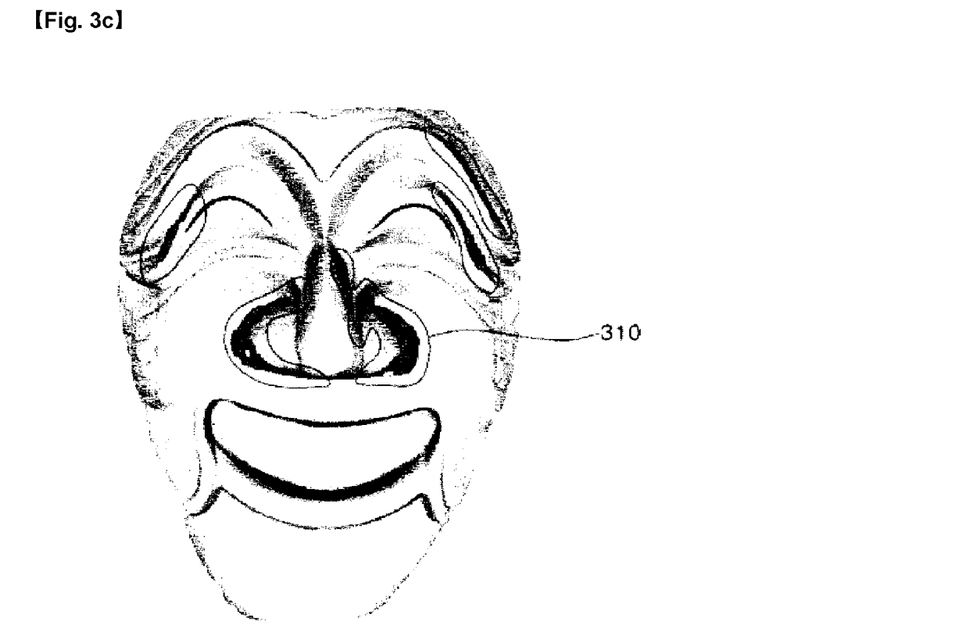

FIGS. 3A to 3C are diagrams for exemplarily describing the acquisition of the 3D primary image of the object 300 from the 2D primary image data acquired by the first camera 120 and the second camera 130 according to an exemplary embodiment of the present invention.

As illustrated at the left of FIG. 3A, the projector 110 may project a plurality of patterns in which intervals between bright parts and dark parts are different on the object plural times and the first camera 120 and the second camera 130 may acquire the image onto which the corresponding pattern is projected as the 2D primary image whenever the projector 110 projects each pattern. The re-viewpoint image generator 210 may acquire an image as illustrated at the right of FIG. 3A from the 2D primary image acquired by the first camera 120 and the second camera 130.

Next, as illustrated in the left of FIG. 3B, the projector 110 may project a check pattern having a predetermined wavelength but may sequentially project four check patterns of which the phases move by π/2 and the first camera 120 and the second camera 130 may acquire the image on which the corresponding pattern is projected whenever the projector 110 projects each pattern. Next, the re-viewpoint image generator 210 may acquire a phase image as illustrated at the right of FIG. 3B from the 2D primary image acquired by the first camera 120 and the second camera 130.

The re-viewpoint image generator 210 may combine the image as illustrated at the right of FIG. 3A with the image as illustrated at the right of FIG. 3B to obtain the 3D primary image as illustrated in FIG. 3C.

In acquiring the 3D data for the specific point of the object 300 by the re-viewpoint image generator 210, the 3D data for the specific point may be acquired by referring to the data for the specific point in the 2D primary image acquired by the first camera 120 and the data for the specific point in the 2D primary images acquired by the second camera 130 but the 3D data for the specific point may not be generated due to the curvature of the object 300 and the points in view of the first camera 120 and the second camera 130. For example, when the specific point is present at a position that may be photographed by the first camera 120 but the specific point is present at a position that is out of a viewing angle of the second camera 130 and thus is not photographed, that is, when the data for the specific point is not present at the 2D primary image acquired by the second camera 130, the 3D data for the specific point may not be obtained and as illustrated in FIG. 3, a 3D data missing area 310 may be present in the 3D primary image.

The re-viewpoint generator 310 may acquire the 3D primary image as illustrated in FIG. 3C and then may serve to convert the acquired 3D primary image into the 2D re-viewpoint image based on the viewpoint at which the projector 110 views the object 300. In more detail, as the first camera 120 or the second camera 130 acquires the 2D image of the object 300, the projector 110 may be considered as one camera to acquire the 2D projector as being acquired by the projector 110 However, the projector 110 is a virtual camera, and therefore may not optically acquire an image, such that the projector may convert the data for the images acquired by the first camera 120 and the second camera 130, for example, the data for the 3D primary image to acquire the 2D re-viewpoint image.

Next, the 2D missing area corrector 220 according to the exemplary embodiment of the present invention may serve to correct the missing area present within the 2D re-viewpoint image acquired by the re-viewpoint image generator 210.

Figure 4:
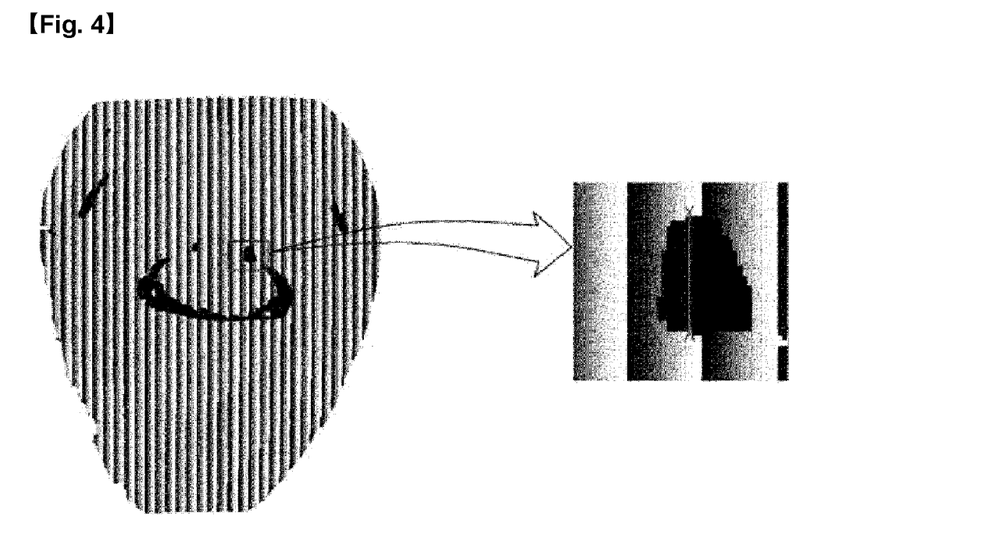
FIGS. 4 and 5 are diagrams for exemplarily describing a correction of missing area in a 2D re-viewpoint image according to an exemplary embodiment of the present invention.
Figure 5:
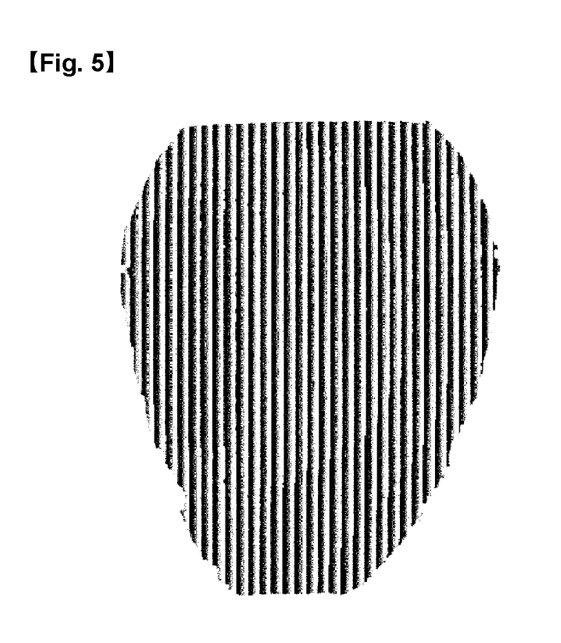

FIGS. 4 and 5 are diagrams for exemplarily describing a correction of the missing area in the 2D re-viewpoint image according to an exemplary embodiment of the present invention.

As described above, the 3D data for the specific point of the object 300 may not be generated due to the curvature of the object 300 and the viewpoint of the first camera 120 and the second camera 130, such that the 3D data missing area may not be present in the 3D primary image. The re-viewpoint image generator 210 generates the 2D re-viewpoint image by referring to the 3D primary image data, and therefore when the missing area is present in the 3D primary image, as illustrated in FIG. 4, the area corresponding to the missing area in the 2D re-viewpoint image may be displayed as the missing area.

The 2D missing area corrector 220 may correct the missing area in the 2D re-viewpoint image by referring to the information on the pattern that the projector 110 projects on the object 300. In more detail, if an angle at which the projector projects a pattern and an angle at which the camera photographs the image of the pattern-projected object are different from each other, even though the projector projects a straight pattern on the object in a vertical direction, the camera acquires the image in the state in which the straight pattern is deformed depending on the curvature of the object, but the 2D re-viewpoint image according to the exemplary embodiment of the present invention corresponds to the image based on the viewpoint at which the projector 110 views the object 300 and therefore it may be expected that the pattern of the 2D re-viewpoint image may have a similar shape to the pattern that the projector 110 projects. That is, the 2D missing area corrector 220 may estimate the missing area in the 2D re-viewpoint image by referring to the information on the pattern that the projector 110 projects. As illustrated in FIG. 4, the missing area may be corrected by an interpolation method using the information on the pattern that the projector 110 projects and the missing area in the 2D re-viewpoint image may be corrected by methods such as an inpainting except for the interpolation method. If the missing area in the 2D re-viewpoint image is corrected by applying the methods such as the interpolation method and the inpainting method, the corrected 2D re-viewpoint image may be acquired as illustrated in FIG. 5.

Next, the 3D correction image generator 230 may serve to generate the 3D correction image by referring to (i) the 2D primary image data acquired by the first camera 120 or the second camera 130 and (ii) the corrected 2D re-viewpoint image information.

For example, the specific point of the object 300 corresponding to the missed area is present at the position that may be photographed by the first camera 120 and thus the data for the specific point is present in the 2D primary image acquired by the first camera 120, but when the specific point is present at the position that is out of the viewing angle of the second camera 130 and thus is not photographed, the 3D data for the specific point may be obtained by referring to (i) the data corresponding to the specific point in the 2D primary image acquired b the first camera 120 and (ii) the data corresponding to the specific point in the corrected 2D re-viewpoint image.

Figure 6:
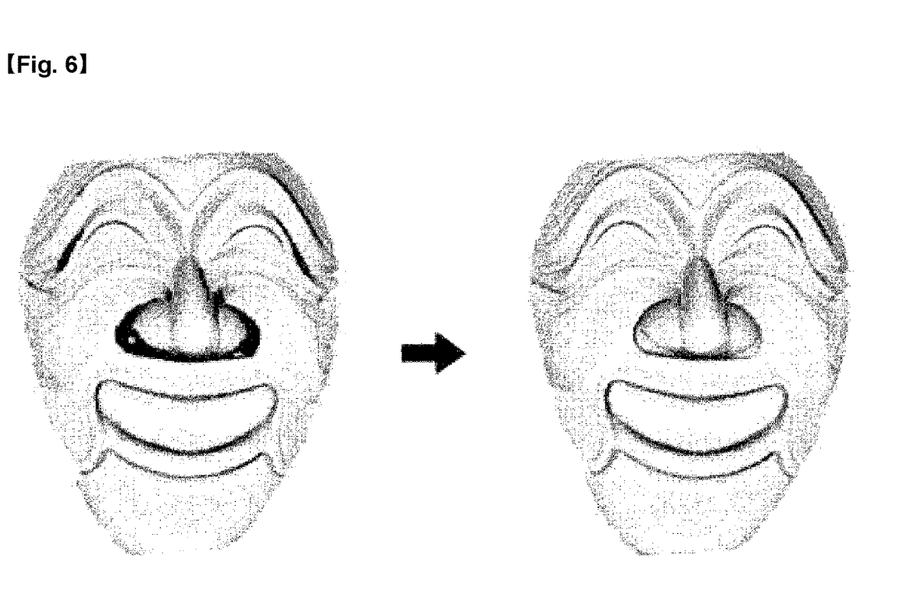
FIG. 6 is a comparison diagram of a 3D image when the existing method for acquiring a 3D image is applied with a 3D image when a method for acquiring a 3D image according to an exemplary embodiment of the present invention is applied.

FIG. 6 is a comparison diagram of a 3D image (left view) when the existing method for acquiring a 3D image is applied with a 3D image (right view) when a method for acquiring a 3D image according to an exemplary embodiment of the present invention is applied.

As illustrated in FIG. 6, when the 3D image of the object is acquired by the existing method for acquiring a 3D image, the 3D data missing area caused by the curvature of the object 300 and the points in view of the first camera 120 and the second camera 130 may be present in the 3D image but according to the exemplary embodiment of the present invention the 3D image without the missing area may be acquired even though the 3D data are not acquired the 2D images acquired by the first camera 120 and the second camera 130.

Finally, the controller 240 according to the exemplary embodiment of the present invention may serve to control the data flow among the re-viewpoint image generator 210, the 2D missing area corrector 220, and the 3D correction image generator 230. That is, the controller 240 according to the exemplary embodiment of the present invention may control the data flow from/to the outside of the apparatus 200 for acquiring a 3D image and the data flow among the respective components of the apparatus 200 for acquiring a 3D image, thereby controlling the re-viewpoint image generator 210, the 2D missing area corrector 220, and the 3D correction image generator 230, respectively, to perform their unique functions.

The exemplary embodiments according to the present invention described above are implemented in a form of program commands capable of being performed through various computer components to thereby be recordable in a computer-readable recording medium. The computer-readable recording medium may include program commands, data files, data structures, or the like, alone or in combination. The program command recorded in the computer-readable recording medium may be designed and configured especially for the present invention, or may be known to those skilled in a field of computer software. An example of the computer-readable recording medium may include magnetic media such as a hard disk, a floppy disk, and a magnetic tape; optical recording media such as a CD-ROM and a DVD; magneto-optical media such as a floptical disk; and a hardware device specially configured to store and perform program commands such as a ROM, a RAM, a flash memory, or the like. Examples of the program commands may include machine language codes such as being made by a compiler as well as high-level language codes capable of being executed by a computer using an interpreter or the like. The hardware device may be configured to be operated as one or more software modules in order to perform the processing according to the present invention, and vice versa.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the sprit of the present invention should not be limited to the above-described exemplary embodiments, and the following claims as well as all modified equally or equivalently to the claims are intended to fall within the scope and spirit of the invention.

The invention claimed is:

1. A method for acquiring 3D shape information of an object by a projector and first and second cameras, comprising:

step (a-1) acquiring, by an image correction apparatus, a 3D image of the object from two-dimensional (2D) image data acquired by at least one of the first and second cameras when a predetermined pattern is projected on the object by the projector and a 2D image of the pattern-projected object is acquired by the at least one of the first and second cameras;

step (a-2) converting, by the image correction apparatus, the acquired 3D image into a 2D re-viewpoint image based on a viewpoint at which the projector views the object, wherein the 2D re-viewpoint image includes a missing area corresponding to 3D data missing area caused by a curvature of the object and points of view of the first and second cameras, wherein the 3D data missing area is an area in which 3D data corresponding to the missing area of the 2D re-viewpoint image are not presented in the acquired 3D image;

step (b) correcting, by the image correction apparatus, the missing area in the 2D re-viewpoint image based on information on the predetermined pattern projected by the projector on the object in order to compensate for the 3D data missing area, and acquiring a corrected 2D re-viewpoint image including a corrected area corresponding the missing area in the 2D re-viewpoint image; and step (c) generating, by the image correction apparatus, corrected 3D image based on both of (i) the 2D image data acquired by the at least one of the first and second cameras in the step (a-1) and (ii) corrected 2D re-viewpoint image information, including information on the corrected image area, acquired in the step (b).

2. The method of claim 1, wherein, in the step (b), the missing area in the 2D re-viewpoint image is corrected by any one of an inpainting method and an interpolation method.

3. The method of claim 1, wherein, in the step (a-1), the projector emits a phase shift interference pattern and a gray code pattern and combines a phase image acquired from the phase shift interference pattern with an image acquired from the gray code pattern to acquire the 3D image.

4. An image correction apparatus for acquiring 3D shape information of an object by a projector and first and second cameras, comprising:

a re-viewpoint image generator configured to:
acquire a 3D image of the object from two-dimensional (2D) image data acquired by at least one of the first and second cameras when a predetermined pattern is projected on the object by the projector and a 2D image of the pattern-projected object is acquired by the at least one of the first and second cameras; and
convert the acquired 3D image into a 2D re-viewpoint image based on a viewpoint at which the projector views the object, wherein the 2D re-viewpoint image includes a missing area corresponding to 3D data missing area caused by a curvature of the object and points of view of the first and second cameras, wherein the 3D data missing area is an area in which 3D data corresponding to the missing area of the 2D re-viewpoint image are not presented in the acquired 3D image;

a 2D missing area corrector configured to correct a missing area in the 2D re-viewpoint image corresponding to 3D data missing area in the acquired 3D image based on information on the predetermined pattern projected by the projector on the object in order to compensate for the 3D data missing area, and to acquire a corrected 2D re-viewpoint image including a corrected area corresponding to the missing area in the 2D re-viewpoint image; and a 3D correction image generator configured to generate corrected 3D image based on both of (i) the 2D image data acquired by the at least one of the first and second cameras and (ii) corrected 2D re-viewpoint image information, including information on the corrected image area, acquired by the 2D missing area corrector.

5. The image correction apparatus of claim 4, wherein the 2D missing area corrector is configured to correct the missing area in the 2D re-viewpoint image by any one of an inpainting method and an interpolation method.

6. The image correction apparatus of claim 4, wherein the projector is configured to emit a phase shift interference pattern and a gray code pattern and the re-viewpoint image generator is configured to combine a phase image acquired from the phase shift interference pattern with an image acquired from the gray code pattern to acquire the 3D image.

* * * * *